United States Patent Office 3,549,684
Patented Dec. 22, 1970

3,549,684
PRODUCTION OF o-CHLORO-
BENZALMALONONITRILE
Jacob Rosin, Maplewood, N.J., assignor to Chris-Craft
Industries, Inc., a corporation of Delaware
No Drawing. Filed Oct. 11, 1968, Ser. No. 766,971
Int. Cl. C06d 7/00; C07c 121/70
U.S. Cl. 260—465                                    4 Claims

ABSTRACT OF THE DISCLOSURE

Orthochlorobenzalmalononitrile, which is the lachrymating agent more commonly known by the code name CS given to this compound by the United States Army Chemical Corps, may be produced in high yields by pyrolyzing acetonitrile and a cyanide selected from the group consisting of hydrogen cyanide and cyanogen chloride at a temperature in the range from about 600° C. to about 1100° C. to form malononitrile in situ and then immediately quenching the hot reaction gas in o-chlorobenzaldehyde, which condenses with the malononitrile to form CS.

INTRODUCTION

This application relates to the production of o-chlorobenzalmalononitrile, which is a lachrymating agent used extensively in military and police operations and is more commonly known by the code name CS given to this compound by the United States Army Chemical Corps. The invention provides an improved process for manufacturing CS directly from acetonitrile, cyanides (hydrogen cyanide or cyanogen chloride) and o-chlorobenzaldehyde.

CS is manufactured by condensing equimolar quantities of o-chlorobenzaldehyde and malononitrile in the presence of a base, as shown by the following reaction:

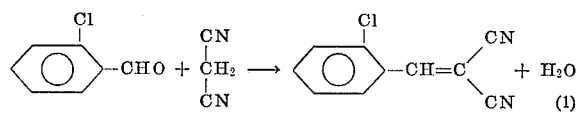

(1)

Because of the increased military use of CS, extensive investigations are being conducted on new and improved processes for producing CS, most of which studies have concentrated on improving the manner in which malononitrile is manufactured, since it is the more costly of the two reagents used to produce CS.

At present, malononitrile is manufactured commercially by the dehydration of cyanoacetamide. Malononitrile may also be produced, however, by pyrolyzing acetonitrile and cyanides (hydrogen cyanide or cyanogen chloride) at a temperature in the range from about 600° C. to about 1100° C. Malononitrile is extremely unstable at these temperatures and rapidly decomposes to a number of byproducts during the work-up of the hot reaction gases.

STATEMENT OF THE INVENTION

The present invention is based on the discovery that orthochlorobenzalmalononitrile is more stable at relatively high temperatures than malononitrile and that, consequently, the hot reaction gases produced by pyrolyzing acetonitrile and cyanides (HCN or CNCl) may be immediately quenched in o-chlorobenzaldehyde to form CS more rapidly than the rate at which the malononitrile in such reaction gases undergoes decomposition.

Based on this discovery, the invention provides an improved process for producing the lachrymatory agent o-chlorobenzalmalononitrile which comprises (a) pyrolyzing a gaseous mixture of acetonitrile and at least an equimolar quantity of a cyanide selected from the group consisting of cyanogen chloride and hydrogen cyanide at a temperature in the range from about 600° C. to about 1100° C. (and preferably in the range from about 700° C. to about 900° C.) to form a reaction gas containing malononitrile, and (b) immediately quenching the hot reaction gas in o-chlorobenzaldehyde to convert substantially all of the malononitrile in the hot reaction gas to o-chlorobenzalmalononitrile, and (c) recovering o-chlorobenzalmalononitrile from the resultant reaction mixture.

EXAMPLE 1

Equimolar quantities of acetonitrile and hydrogen cyanide are separately preheated and introduced into a tubular reactor under turbulent mixing conditions so that the temperature of pyrolysis of the mixed gases is in the range from about 700° C. to about 850° C. The residence time of the pyrolysis should be such that the yield of malononitrile is at its highest point just prior to quenching the hot reaction gas into o-chlorobenzaldehyde.

As the hot reaction gas exits from the tubular reaction (or reaction zone), it is immediately quenched by spraying o-chlorobenzaldehyde into the hot reaction gas, under which conditions malononitrile condenses with the o-chlorobenzaldehyde to form o-chlorobenzalmalononitrile, which dissolves in the hot o-chlorobenzaldehyde. The reaction mixture is cooled further, excess o-chlorobenzaldehyde is distilled off, and the residue taken up in a suitable solvent (such as ethanol, isopropanol, carbon disulfide, chloroform or carbon tetrachloride) and treated with charcoal to absorb color bodies. After filtration, substantially pure (M.P. 93°–95° C.) o-chlorobenzalmalononitrile may be recovered by crystallization.

EXAMPLE 2 o-Chlorobenzalmalononitrile may be produced by pyrolyzing equimolar quantities of acetonitrile and cyanogen chloride by the same technique described in Example 1, except that the pyrolysis of acetonitrile and CNCl is conducted at a temperature of approximately 700° C.

I claim:
1. A process for producing the lachrymating agent o-chlorobenzalmalononitrile which comprises (a) pyrolyzing a gaseous mixture of acetonitrile and at least an equimolar amount of a cyanide selected from the group consisting of hydrogen cyanide and cyanogen chloride at a temperature in the range from about 600° C. to about 1100° C. to produce a hot reaction gas containing malononitrile, (b) immediately quenching the hot reaction gas in o-chlorobenzaldehyde, thereby forming a solution of o-chlorobenzalmalononitrile in o-chlorobenzaldehyde, and (c) recovering o-chlorobenzalmalononitrile from the resulant solution.

2. A process for producing o-chlorobenzalmalononitrile according to claim 1, in which a gaseous mixture of acetonitrile and hydrogen cyanide is pyrolyzed at a temperature in the range from about 700° C. to about 900° C.

3. A process for producing o-chlorobenzalmalononitrile according to claim 1, in which a gaseous mixture of acetonitrile and cyanogen chloride is pyrolyzed at a temperature in the range from about 700° C. to about 900° C.

4. A process for producing o-chlorobenzalmalononitrile according to claim 1, in which the residence time of pyrolysis for the gaseous mixture of acetonitrile and the cyanide is such that the yield of malononitrile is at its highest level in the hot reaction gas just prior to quenching the hot reaction gas in o-chlorobenzaldehyde.

References Cited

UNITED STATES PATENTS

| 2,553,406 | 5/1951 | Dixon | 260—465.8 |
| 3,055,738 | 9/1962 | Krebaum | 260—465.8X |
| 3,250,798 | 5/1966 | Shulgin | 260—465 |
| 3,405,161 | 10/1968 | Proper et al. | 260—465 |
| 3,417,126 | 12/1968 | Taguchi et al. | 260—465.8 |
| 3,489,785 | 1/1970 | Kurono et al. | 260—465 |

CHARLES B. PARKER, Primary Examiner

D. H. TORRENCE, Assistant Examiner

U.S. Cl. X.R.

260—465.8; 424—304